(12) United States Patent
Friedman

(10) Patent No.: US 9,304,592 B2
(45) Date of Patent: Apr. 5, 2016

(54) ELECTRONIC DEVICE CONTROL BASED ON GESTURES

(75) Inventor: Lee G. Friedman, Alpharetta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 12/945,346

(22) Filed: Nov. 12, 2010

(65) Prior Publication Data

US 2012/0124516 A1    May 17, 2012

(51) Int. Cl.
    *G06F 3/01*         (2006.01)
    *G06F 3/0482*     (2013.01)
    *H04L 29/08*     (2006.01)

(52) U.S. Cl.
    CPC .............. *G06F 3/017* (2013.01); *G06F 3/0482* (2013.01); *H04L 67/306* (2013.01)

(58) Field of Classification Search
    CPC ...... G06F 3/017; G06F 3/0482; H04L 67/306
    USPC .............................. 715/810, 726, 863; 348/154
    See application file for complete search history.

(56) References Cited

U.S. PATENT DOCUMENTS

| | | | | |
|---|---|---|---|---|
| 5,805,674 | A * | 9/1998 | Anderson, Jr. ............. | 379/93.03 |
| 6,006,262 | A * | 12/1999 | Thomason et al. ........... | 709/224 |
| 6,160,899 | A * | 12/2000 | Lee et al. ..................... | 382/103 |
| 6,195,104 | B1 * | 2/2001 | Lyons ........................... | 345/473 |
| 6,222,465 | B1 * | 4/2001 | Kumar et al. ................ | 341/20 |
| 6,505,348 | B1 * | 1/2003 | Knowles et al. ............ | 725/49 |
| 6,567,121 | B1 * | 5/2003 | Kuno ......................... | 348/211.3 |
| 6,678,362 | B2 * | 1/2004 | Hong et al. ............... | 379/102.03 |
| 7,379,778 | B2 | 5/2008 | Hayes et al. | |
| 7,886,229 | B2 * | 2/2011 | Pachet ........................ | 715/726 |
| 2002/0075334 | A1 | 6/2002 | Yfantis | |
| 2003/0005135 | A1 * | 1/2003 | Inoue et al. ................... | 709/229 |
| 2004/0203387 | A1 | 10/2004 | Grannan | |
| 2004/0205068 | A1 * | 10/2004 | Iyer et al. ......................... | 707/10 |
| 2005/0212911 | A1 * | 9/2005 | Marvit et al. ................. | 348/154 |
| 2007/0211734 | A1 * | 9/2007 | Yang et al. .................... | 370/401 |
| 2007/0234380 | A1 * | 10/2007 | Sahasrabudhe et al. ....... | 725/25 |
| 2008/0104547 | A1 | 5/2008 | Morita et al. | |

(Continued)

FOREIGN PATENT DOCUMENTS

| | | |
|---|---|---|
| GB | 2466332 A | 6/2010 |
| WO | 9934276 A2 | 7/1999 |

OTHER PUBLICATIONS

Fong, et al. "Novel Interfaces for Remote Driving: Gesture, Haptic and PDA", Nov. 2000, 12 pp.

(Continued)

*Primary Examiner* — Jennifer To
*Assistant Examiner* — Li Sun
(74) *Attorney, Agent, or Firm* — Toler Law Group, PC

(57) ABSTRACT

Systems and methods for electronic device control based on gestures are provided. A particular method includes sending a menu from a gesture controller to a display device. The menu includes selectable options to control at least one electronic device. The method includes detecting a first user gesture at the gesture controller in response to three dimensional (3D) image data obtained from a gesture camera. The method includes determining at least one command for one or more electronic devices at the gesture controller based on the first user gesture and based on the menu. The method also includes sending the at least one command from the gesture controller to the one or more electronic devices.

20 Claims, 5 Drawing Sheets

(56) References Cited

U.S. PATENT DOCUMENTS

| | | | |
|---|---|---|---|
| 2008/0170776 A1* | 7/2008 | Albertson et al. | 382/154 |
| 2008/0235627 A1* | 9/2008 | Torning et al. | 715/841 |
| 2008/0235749 A1* | 9/2008 | Jain et al. | 725/114 |
| 2009/0066648 A1 | 3/2009 | Kerr et al. | |
| 2009/0100460 A1* | 4/2009 | Hicks et al. | 725/35 |
| 2009/0139778 A1 | 6/2009 | Butler et al. | |
| 2010/0083167 A1* | 4/2010 | Kikuchi et al. | 715/786 |
| 2010/0083373 A1* | 4/2010 | White | G06F 3/017 726/21 |
| 2010/0088637 A1* | 4/2010 | Liu | 715/810 |
| 2010/0100822 A1* | 4/2010 | Aaron et al. | 715/730 |
| 2010/0123668 A1* | 5/2010 | Kuhn et al. | 345/173 |
| 2010/0159893 A1* | 6/2010 | Baldwin et al. | 455/413 |
| 2010/0208035 A1 | 8/2010 | Pinault et al. | |
| 2010/0281436 A1* | 11/2010 | Kipman et al. | 715/863 |
| 2010/0306685 A1* | 12/2010 | Giaimo et al. | 715/765 |
| 2011/0026765 A1* | 2/2011 | Ivanich et al. | 382/103 |

OTHER PUBLICATIONS

Premaratne, P., et al. "Consumer Electronics Control System Based on Hand Gesture Moment Invariants", Faculty of Informatics—Papers, University of Wollongong, 2007, pp. 35-41.

Skelton, P. "Hand Gesture Recognition Technology Now a Reality" from http://www.connectedhometechnology.com, Oct. 28, 2008, viewed Sep. 2, 2010, 2 pp.

Habib, Hafiz Adnan Thesis entitled "Gesture Recognition Based Intelligent Algorithms for Virtual Keyboard Development", Department of Electrical Engineering—University of Engineering and Technology Taxila, Jun. 2007, 87 pp.

Freeman, W, et al. "Television Control by Hand Gestures", Mitsubishi Electric Research Laboratories, Dec. 1994, 7 pp.

Garg, P., et al. "Vision Based Hand Gesture Recognition", World Academy of Science, Engineering and Technology, 2009, 6 pp.

"Frequently Asked Questions—Open Remote FAQ's", from http://www.openremote.org/display/FAQS/Frequently+Asked+Questions, Dec. 2009, viewed Sep. 2, 2010, 4 pp.

International Search Report and Written Opinion of the International Searching Authority for International Application No. PCT/US2011/059878, Mailed on Mar. 23, 2012, 9 pages.

"Analyzing Body Language: Gesture Recognition" from http://www.datehookup.com/content-analyzing-body-language-gesture-recognition, retrieved on Sep. 2, 2010, 3 pages.

Chen, S. et al., "Mister Gloves—A Wireless USB Gesture Input System", from http://courses.cit.cornell.edu/ee476/FinalProjects/s2010/ssc88_egl27, retrieved on Sep. 2, 2010, copyright 2010 Cornell University, 27 pages.

* cited by examiner

ELECTRONIC DEVICE CONTROL BASED ON GESTURES

FIELD OF THE DISCLOSURE

The present disclosure is generally related to a gesture controller capable of controlling one or more electronic devices based on gestures made by a user.

BACKGROUND

Remote control devices are prevalent and are commonly supplied with consumer electronic devices. Some remote control devices may be used to control devices throughout a residence when the devices are part of a home network supported by a residential gateway system. Some remote control devices may be able to convert spoken words into commands. A user typically needs to hold, touch, or be near (e.g. to speak a command) a remote control device to use the remote control device.

DETAILED DESCRIPTION

Electronic devices within a residence may be controlled based on gestures made by a user. The gestures may allow for user control of one or more devices without the need for the user to hold, wear, or be in contact with a sensor or a remote control device. Gestures of a user may be detected by a three dimensional (3D) image device. Data from the 3D image device may be analyzed by a gesture controller to determine whether gestures made by the user should be ignored, should result in sending a menu to a display device, should result in navigation of the menu, should result in selection of menu options, or should result in the gesture controller sending at least one command to one or more devices. The gesture controller may replace a remote control device, may be used when the user does not desire to use or cannot easily access the remote control device, or may be used when the user wants to control a device that is able to be controlled using the gesture controller but is not able to be controlled by the remote control device.

In a particular embodiment, a system includes a three dimensional (3D) image device configured to provide 3D image data of movements of a user. The system includes a display interface configured to send options of a menu to a display device. The system includes a processor configured to analyze the 3D image data to provide at least one of an instruction to change the menu and at least one command for one or more devices. The system also includes at least one interface to send the at least one command to the one or more device.

In a particular embodiment, a method includes sending a menu from a gesture controller to a display device. The menu includes selectable options to control at least one electronic device. The method includes detecting a first user gesture at the gesture controller in response to three dimensional (3D) image data obtained from a gesture camera. The method includes determining at least one command for one or more electronic devices at the gesture controller based on the first user gesture and based on the menu. The method also includes sending the at least one command from the gesture controller to the one or more electronic devices.

Figure 1:
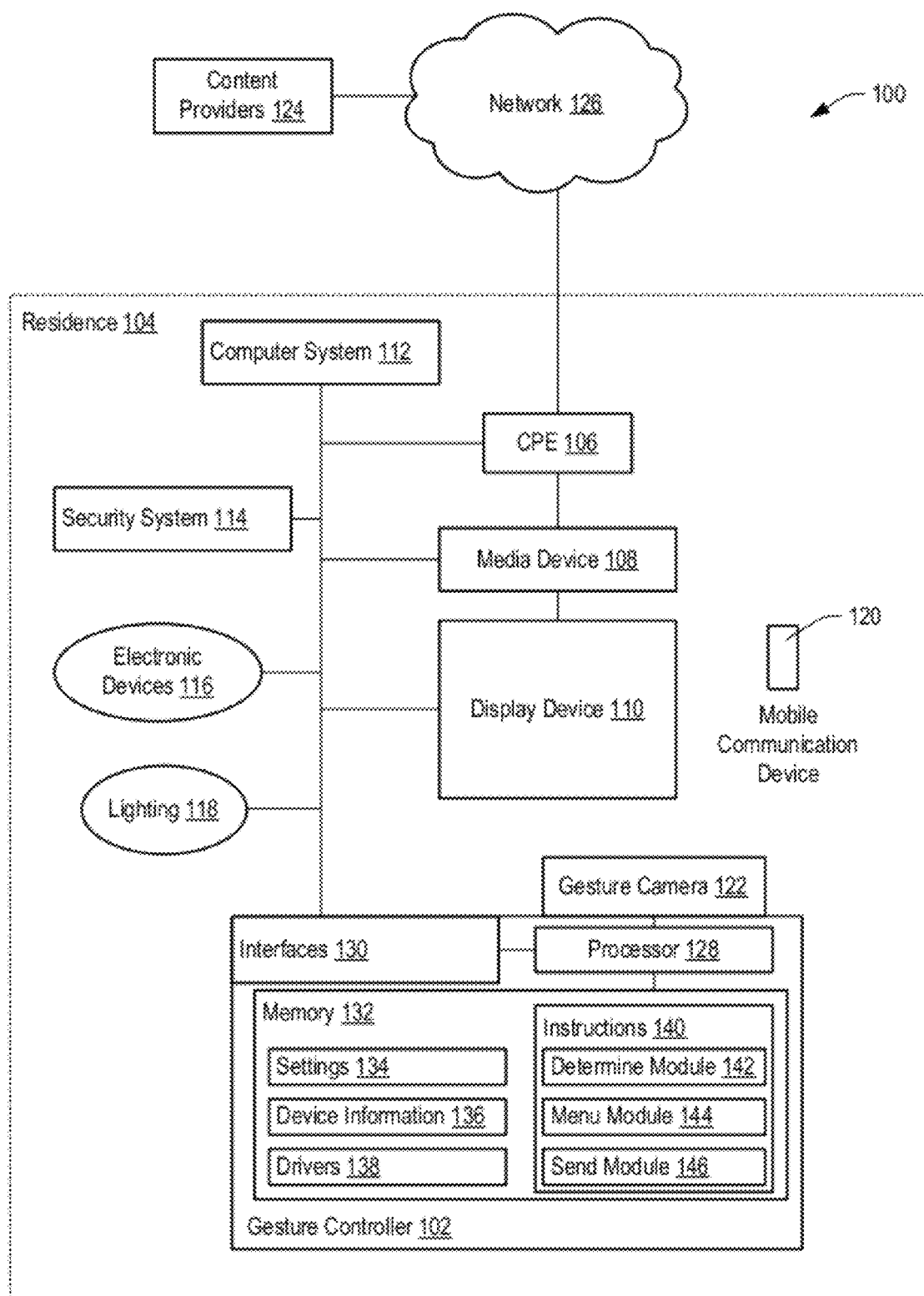
FIG. 1 is a block diagram of a first embodiment of a system including a gesture controller for device control based on gestures.

FIG. 1 is a block diagram of a particular embodiment of a system 100 that includes a gesture controller 102 for device control based on gestures. The gesture controller 102 may be in a residence 104. The gesture controller 102 may be coupled via a wired connection or a wireless connection to one or more devices 106-120 that are to be controlled. The devices 106-120 may include, but are not limited to, customer premises equipment (CPE) 106, at least one media device 108, at least one display device 110, at least one computer system 112, a security system 114, one or more electronic devices 116 associated with the residence 104, lighting 118 associated with the residence 104, and at least one mobile communication device 120.

The gesture controller 102 may receive three dimensional (3D) image data from a gesture camera 122. The gesture camera 122 may be an integral component of the gesture controller 102, or the gesture camera 122 may have a wired or wireless data connection with the gesture controller 102. The gesture controller 102 may analyze the 3D image data from the gesture camera 122 to determine one or more gestures made by a person within range of the gesture camera 122. Certain gestures detected by the gesture controller 102 may cause the gesture controller 102 to send information to the display device 110 (e.g., a menu), to change information sent to the display device 110 (change or update a menu sent to the display device 110), or may cause the gesture controller 102 to send commands to one or more of the devices 106-120. The information may be sent directly to the display device 110, or the information may be sent to the display device 110 via another device (e.g., via the media device 108).

The gesture camera 122 may be any type of camera able to provide 3D image data to the gesture controller 102. For example, the gesture camera 122 may include two or more offset camera lenses that allow combined 3D image data to be generated. In another example, the gesture camera 122 may include a lens, an emitter (e.g., an infrared emitter), and a receiver that allows 3D image data to be generated. Gesture cameras 122 may be available from several companies, including Canesta, Inc. (Sunnyvale, Calif.), PRIMESENSE Ltd. (Tel-Aviv, Israel), and MICROSOFT Corporation Inc. (Redmond, Wash.).

The CPE 106 may facilitate communications between one or more devices (e.g., the media device 108) and one or more content providers 124 via a network 126. The CPE 106 may include a router, a wireless router, a local area network device, a modem (e.g., a digital subscriber line (DSL) modem or a cable modem), a residential gateway, other communication facilitator, or combinations thereof.

The media device 108 may be a set-top box device or similar device that receives media content from the one or more content providers 124 via the network 126. The media content may be provided to the display device 110 or to other electronic devices (e.g., the computer system 112). The media content may be television programming, video-on-demand, internet content, or other types of media. The media device 108 may provide a user interface to the display device 110 that allows the person to change settings of the gesture controller 102. A remote control device may be used to control at least the media device 108 and the display device 110.

The computer system 112 may be a desk top computer, a lap top computer, or a tablet computer. The computer system 112 may be able to provide a user interface that allows the person to change settings of the gesture controller 102.

The security system 114 may provide security services for the residence 104. The services may include, but are not limited to, monitoring windows, doors, motion detectors, fire alarms, carbon monoxide alarms, other devices, and combinations thereof for alarm conditions; controlling electronic locks; controlling lighting; and combinations thereof. The security system 114 may inform (e.g., by an alarm, by display on the display device 110, by phone, by email, by text messages, etc.) people in the residence 104, specific individuals, authorities, or combinations thereof, when one or more alarm conditions occur at the residence 104. The authorities may be personnel of a security company, local police, local firefighters, medical personnel, other service personnel, or combinations thereof.

The electronic devices 116 may include, but are not limited to, audio equipment (e.g., stereo receivers, compact disc players, etc.), video equipment (e.g., digital video disc players, digital video recorders, etc.), thermostats associated with heating/cooling systems for the residence 104, telephones, base stations for mobile telephones, kitchen appliances, or other devices that can be controlled via received signals. For example, the electronic devices 116 may be controlled to turn the electronic devices 116 on or off. In another example, the electronic devices 116 may be controlled to perform more complex functions, such as increment or decrement a channel; increase or decrease volume, temperature, light intensity, rewind speed, or fast forward speed; forward an incoming phone call to voice mail, or other electronic device function.

The lighting 118 in the residence 104 may include lights in various rooms in the residence 104, lights outside of the residence 104, or both. The lighting 118 may be turned on or turned off by commands from the gesture controller 102. Additionally or in the alternative, intensity of the lighting 118 may be changed in response to commands from the gesture controller 102 (e.g., when particular lights are controlled by dimmer switches).

The mobile communication device 120 may be able to couple to a wireless communication network. The mobile communication device 120 may connect to the network 126 via the CPE 106. The presence of the mobile communication device 120 in the residence 104 or in a particular area of the residence may 104 be detected by the CPE 106, the media device 108, the computer system 112, a base station for the mobile communication device 120, a femtocell coupled to the CPE 106 to provide strong signal for the mobile communication device, another electronic device, or combinations thereof. When the mobile communication device 120 is detected near the display device 110, the gesture controller 102 may send to the display device 110 a notification of an incoming call to the mobile communication device 120 and may provide options regarding on how to handle the incoming call. The mobile communication device 120 may be near the display device 110 when the mobile communication device 120 is in the residence 104 or when the mobile communication device 120 is in the same room as the display device 110.

The gesture controller 102 may include a processor 128, one or more interfaces 130 coupled to the processor 128, and a memory 132 coupled to the processor 128. The one or more interfaces 130 may receive signals from, and transmit signals to, the devices 106-120. The one or more interfaces 130 may include wired interfaces and wireless interfaces. For example, the interfaces 130 may include, but are not limited to, a network interface, a display interface, a structural wiring interface, an infrared interface, an X10 interface, and combinations thereof.

The memory 132 may include settings 134, device information 136, one or more drivers 138, and instructions 140. The settings 134 may specify which devices 106-120 in the residence 104 are to be controllable with the gesture controller 102. The settings 134 may also allow user defined gestures to be stored and utilized, may define what gestures activate a control session, what gestures end a control session, what gestures navigate menus, what gestures select options, and what gestures specify particular commands for the devices 106-120. A single gesture may be used to provide commands to different ones of the devices 106-120. For example, the gesture of raising or lowering an arm may be specified in the settings 134 to raise or lower volume associated with the display device 110, to raise or lower volume of one or more of the electronic devices 116 (e.g., a stereo system or a radio), and to dim or brighten lighting 118 that is coupled to a controllable dimmer switch.

The settings 134 may be accessed via a user interface displayed on the display device 110. For example, the media device 108, the computer system 112, the gesture controller 102, or another device may send the user interface to the display device 110. The user interface to change the settings 134 may be accessible via the computer system 112 or via a device other than the display device 110.

The device information 136 may include information regarding devices to be controlled (e.g., the devices 106-120 identified in the settings 134). The device information 136 for a particular device may include, but is not limited to, an address or identifier used to communicate with the particular device, which particular interface of the interfaces 130 is to be used to communicate with the particular device, and which driver of the drivers 138 is to be used to provide instructions for particular commands to be implemented by the particular device. When a new device is added to the settings 134, an address or identifier used to communicate with the new device may be added manually, or the gesture controller 102 may automatically determine the address or identifier for the new device.

The drivers 138 may provide instructions that are sent to the devices 106-120 to implement commands. When a new device is added to the settings 134, the user interface may provide an option to provide or identify an existing driver for the new device, or the user interface may provide an option to obtain the driver from the content providers 124 via the network 126. A particular driver of the drivers 138 may be specific to a single device (e.g., to the media device) or may be applicable to many devices (e.g., to individual lights of the lighting 118). The gesture controller 102 may include instructions to periodically or occasionally search for and obtain updated drivers for the devices 106-120 that the gesture controller 102 is able to control via the network 126.

The instructions 140 may include code executable by the processor 128 to perform particular tasks. To simplify the description, the instructions 140 are shown as separate functional modules with each functional module associated with particular tasks. For example, the instructions 140 may be separated into a determine module 142, a menu module 144, and a send module 146.

The determine module 142 may be executed by the processor 128 to process 3D image data from the gesture camera 122. When the determine module 142 is running, the processor 128 may analyze the received 3D image data to determine when a recognized gesture is made by a person within range of the gesture camera 122. Recognized gestures may include, for example, an initiate gesture, an end gesture, a navigation gesture, and a select gesture. The initiate gesture may be used to begin a gesture session. For example, when the determine module 142 detects a person near the gesture camera 122 performing the initiate gesture, the gesture controller 102 may send a menu to the display device 110. The gesture controller 102 may ignore gestures made by one or more people in range of the gesture camera 122 until the initiate gesture is detected. When more than one person is in range of the gesture camera 122, the running determine module 142 may cause the processor to identify one or more characteristics of a person who made the initiate gesture so that gestures by people other than the person who performed the initiate gesture are ignored during the gesture session. The gesture session may last until the determine module 142 detects the end gesture from the person who performed the initiate gesture or until a preset inactivity time (e.g., an inactivity time specified in the settings 134) has passed since a last command was received from the person. When the end gesture is detected or the preset inactivity time has passed, the gesture controller 102 may remove the menu from the display device 110 and wait for detection of a new occurrence of the initiate gesture.

The end gesture may be the same gesture as the initiate gesture or may be a different gesture than the initiate gesture. For example, the initiate gesture specified in the settings 134 may include the person moving one or both hands towards and away from the display device 110. The end gesture specified in the settings 134 may include the person bowing towards and away from the display device with the persons arms folded. Other preset gestures or user defined gestures may be chosen as the initiate gesture or the end gesture.

The navigation gesture may be used to navigate a set of user selectable options, such as a menu. For example, in response to the navigation gesture, the gesture controller 102 may cause movement of an indication that shows which option of the menu is currently selected. An unselected option may be slightly transparent when not selected. An option that is highlighted and slightly transparent may indicate that the option can be selected by the person (e.g., by performing the selection gesture). An option that is highlighted and opaque may have been selected by the person performing the selection gesture. For example, the navigation gesture may be performed by the person moving one or both arms right to left to move the highlight from a first option to a second option to the left of the first option or to the rightmost option when the highlight is on the leftmost option. The navigation gesture may be performed by the person moving one or both arms left to right to move the highlight from a first option to a second option to the right of the first option or to the leftmost option when the highlight is on the rightmost option. As another example, the options of the menu may be presented in a circular pattern on the display device. The navigation gesture may be performed using a circular motion, either clockwise or counterclockwise, to move the highlight. Other preset gestures or user defined gestures may be chosen as the navigation gesture.

The selection gesture may be a gesture that indicates selection of a highlighted option. For example, the selection gesture indicated in the settings 134 may be performed by the person moving one or both open hands towards and away from the display device 110. Other preset gestures or user defined gestures may be chosen as the selection gesture.

When the processor 128 running the determine module 142 detects the initiate gesture, the processor 128 may use the menu module 144 to present the menu to the display device 110. The menu may include options selectable by the person. The options may include symbols, icons, text, video clips (i.e., animated icons), or combinations thereof. The video clips may be looped. An option may be presented in a manner that indicates to the person what the option does or represents. The menu option may also indicate a particular gesture that can be performed to select the option without using the navigate gestures to navigate the menu. For example, a particular option to present a submenu for devices other than the media device 108 and the display device 110 that are controllable via the gesture controller 102 may include a title of "Other Devices." The particular menu option may also include a video clip of a person clapping, may include the text "clap to select," or both to indicate that that a submenu for other devices will be displayed on the display device 110 when the option is selected using the navigation gesture and the selection gesture, or when the user performs the gesture of clapping.

When the person selects an option associated with a submenu (e.g., via a gesture), the processor 128 running the determine module 142 may use the menu module 144 to present the submenu. When the person selects an option associated with a command (e.g., via a gesture), the processor 128 may use the send module 146 to send a command or commands to an appropriate device or devices, such as one of the devices 106-120. For each command that is to be sent in response to the selection gesture, the processor 128 executing the send module 146 may access the device information 136 to determine which interface of the interfaces 130 to use to communicate with the appropriate device and may access the drivers 138 to create the appropriate command for the appropriate device. The processor 128 may send the created command to the appropriate device via the appropriate interface of the interfaces 130.

In some embodiments, the gesture controller 102 may be part of another device. For example, the gesture controller 102 may be a component of the media device 108, the display device 110, or the computer system 112. In some embodiments, the functionality of the menu module 144 may be present in and performed by another device (e.g., the media device 108, the display device 110, or the computer system 112). For example, when the processor 128 running the determine module 142 detects a particular gesture, an indication of the gesture may be sent to the media device 108. A processor of the media device 108 may execute instructions similar to the instructions of the menu module 144 that utilize the indication of the gesture to send appropriate display information (e.g., a submenu) to the display device 110.

Figure 2:
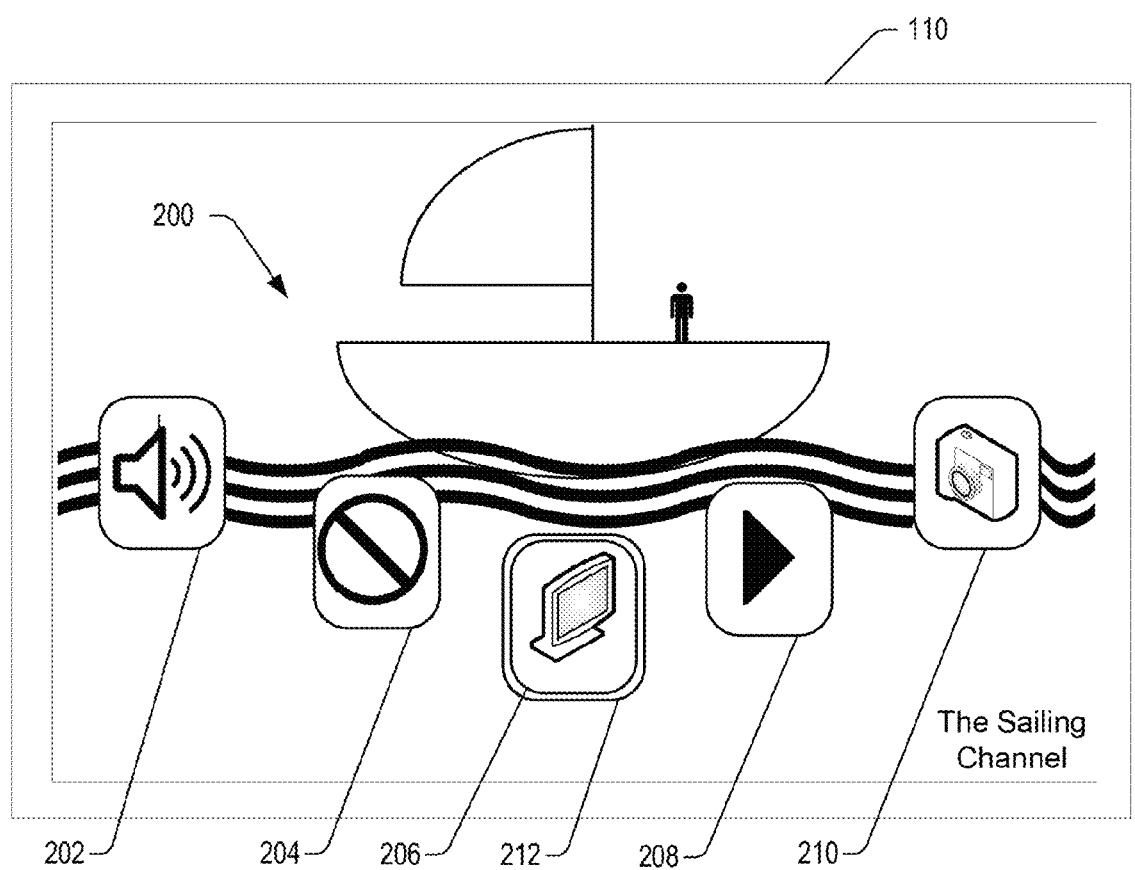
FIG. 2 is a diagram that illustrates an embodiment of a menu sent to a display device by the gesture controller for device control based on gestures.

FIG. 2 depicts an embodiment of a menu 200 sent to a display device 110 for device control based on gestures. The menu 200 may be sent to the display device 110 by a gesture controller, such as the gesture controller 102 depicted in FIG. 1. The menu 200 may be a top menu that is presented in response to a person in range of a gesture camera (e.g., the gesture camera 122 of FIG. 1) performing an initiate gesture. The menu 200 may include a plurality of icons associated with user selectable options, such as a volume icon 202, a mute icon 204, a channel icon 206, a play icon 208, and a devices icon 210. As depicted in FIG. 2, the channel icon 206 is highlighted, as indicated by a highlight box 212 around the channel icon 206. A user may move the highlight box 212 to the left or right by performing an appropriate navigate gesture. The user may select one of the icons 202-210 by highlighting the icon using the appropriate navigation gesture and by performing a select gesture. Some or all of the icons 202-210 may be associated with gestures that enable the user to quickly select particular icons. For example, after performing the initiate gesture, the person may perform a gesture of placing the person's hands against the person's ears to select the volume icon 202 or perform a gesture of placing the person's hands in front of the person's mouth to select the mute icon 204.

Selection of an icon 202-210 may result in presentation of a new menu. For example, when the person selects the volume icon 202, a submenu may be presented that includes additional icons, indications of gestures, or both that enable the person to increase the volume associated with the display device 110, decrease the volume associated with the display device 110, or end the gesture session when the volume is at a desired level. Selection of the channel icon 206 may present a submenu that includes additional icons, indications of gestures, or both to that enable the person to increase the channel number, decrease the channel number, or end the gesture session. Selection of the play icon 208 may present a list of devices that are available to play media content and an option to end the gesture session. When the person selects a particular device capable of playing media content or the particular device is the only device capable of playing media content, a menu that includes additional icons, indications of gestures, or both that enables the person to control the particular device and end the gesture session may be displayed. For example, controls for the particular device may include, but are not limited to, functions such as play, pause, record, fast forward, and rewind. Selection of the devices icon 210 may present a list of available devices, a list of available applications (e.g., a photo application that presents a slide show of photographs to the display device 110), an option to end the gesture session, or combinations thereof. Selection of a particular available device may present a submenu that includes additional icons, indications of gestures, or both that enable the person to control the particular available device and end the gesture session. Selection of a particular application may cause the application to run.

Selection of an icon 202-210 may result in at least one command being sent to one or more devices. For example, in response to selection of the mute icon 204 a gesture controller may send a command to an audio device associated with the display device 110 to mute the audio device when the audio device is not muted or to resume providing audio for the audio device when the device is muted.

Figure 3:
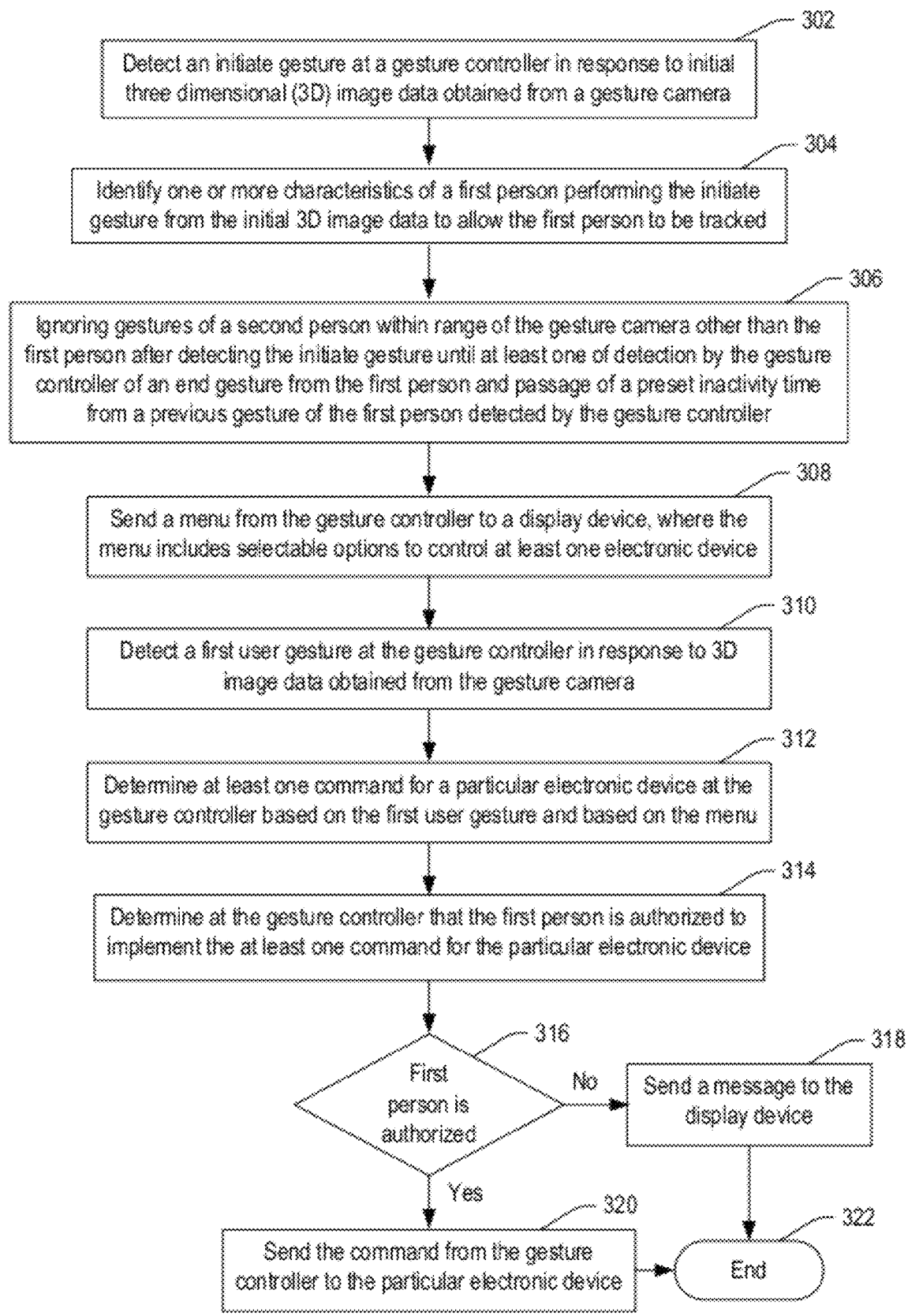
FIG. 3 is a flow chart of a first particular embodiment of a method for device control based on gestures.

Referring to FIG. 3, a flow chart of a first particular embodiment of a method for electronic device control based on gestures is shown. The method may be performed, for example, by the system depicted in FIG. 1.

At 302, an initiate gesture may be detected at a gesture controller in response to initial three dimensional (3D) image data obtained from a gesture camera. The initiate gesture may be a general initiate gesture or a specific gesture for a particular electronic device. The general initiate gesture may result in presentation of a menu (e.g., the menu 200 of FIG. 2) that that has options that can be selected to present submenus, to send commands, or both. The specific gesture for the particular device may be selected to present submenus, commands, or both for the particular device.

A user of the gesture controller may define a specific gesture for a particular device using a set-up feature of the gesture controller. For example, the user may access the set-up feature and select a particular gesture that will be associated with activating a menu associated with a security system. The particular gesture may be chosen from a set of pre-defined gestures or the particular gesture may be performed by the user in front of the gesture camera to establish a new gesture. The user may define one or more other gestures for the security system or other devices, for the initiate gestures, for navigation gestures, for end gestures, for selection gestures, or other types of gestures. The set-up feature may be accessed by various ways. For example, the set-up feature may be accessed by using an activation sequence on the gesture controller (e.g., pressing a set-up button of the gesture controller), by using a remote control device, by using an access device coupled to the gesture controller (e.g., a computer system or a set-top box device), by using gestures to access the set-up feature through the gesture controller, or combinations thereof.

The gesture controller may identify one or more characteristics of a first person performing the initiate gesture from the initial 3D image data to allow the first person to be tracked, at 304. The one or more characteristics may include, but are not limited to, distinct features of the first person (e.g., hair length, hair color, height, facial characteristics, visible tattoos, etc.), clothing or jewelry worn by the first person, location of the first person in a room, or combinations thereof. The location characteristic may be updated when the first person changes location in the room.

At 306, gestures of a second person within range of the gesture camera other than the first person may be ignored after detecting the initiate gesture. For example, gestures performed by the second person may be ignored until the gesture controller detects an end gesture from the first person. In another example, gestures performed by the second person may be ignored until passage of a preset inactivity time from a previous gesture of the first person detected by the gesture controller. The inactivity time may be a parameter that the user can set via the set-up feature of the gesture controller. The end gesture may be the same as the initiate gesture or the end gesture may be a different gesture. When the end gesture is received from the first person, or when passage of the preset inactivity time occurs, received gestures may be ignored until the gesture controller detects another initiate gesture from the person or from another person.

At 308, a menu may be sent from the gesture controller to a display device. The menu may include selectable options to control at least one electronic device. The menu may be sent in response to detection of the initiate gesture by the first person. Selection of the selectable options may result in presentation of one or more submenus or may result in generation of one or more commands to one or more devices.

At 310, a first user gesture may be detected at the gesture controller in response to 3D image data obtained from the gesture camera. The first user gesture may be a gesture made by the first person. A command for a particular device may be determined at the gesture controller based on the first user gesture and based on the menu, at 312.

At 314, the gesture controller may determine that the first person is authorized to implement the at least one command for the particular device. Some commands (e.g., increasing or decreasing volume, muting an electronic device, adjusting lighting, etc.) may be made by any person. Other commands (e.g., changing channels, controlling a telephone, responding to an alarm condition of a security system, etc.) may be limited to a selected person or selected people. Restrictions for certain devices may be time dependent. For example, changing channels of a television may be unrestricted during a particular time slot (e.g., from 8:00 am to 6:00 pm) and may be restricted to one or more particular adults at other times. The authorization may be based on the one or more identified characteristics of the first person, the first person may be prompted to supply additional information, or both. The additional information may include, but is not limited to, a username, a password, a voice sample, fingerprint input, other identification credentials, or combinations thereof. Time dependencies and types of additional information needed for identification may be specified using the set-up feature of the gesture controller.

A decision based on the determination of whether the first person is authorized to implement the at least one command may be made, at 316. When the determination is that the first person is not authorized to implement the command, a message may be sent to the display device, at 318. The message may inform the first person that control of the particular device by the first person has been denied.

In a particular embodiment, other actions may be taken when the determination is that the first person is not authorized to implement the command. For example, user specified settings (entered via the set-up feature of the gesture controller) may determine what happens when an attempt to command an electronic device fails. The settings may include, but are not limited to, a number of attempts to access a device before access to the device is locked out for a user specified time, sending a message (e.g., a text message, an e-mail, or a phone message) to a designated person or people when a specified number of attempts fail, specific content of messages sent to the display device when attempts fail, and combinations thereof.

When the determination is that the first person is authorized to implement the command, the command may be sent from the gesture controller to the particular device, at 320. The method may end, at 322.

Figure 4:
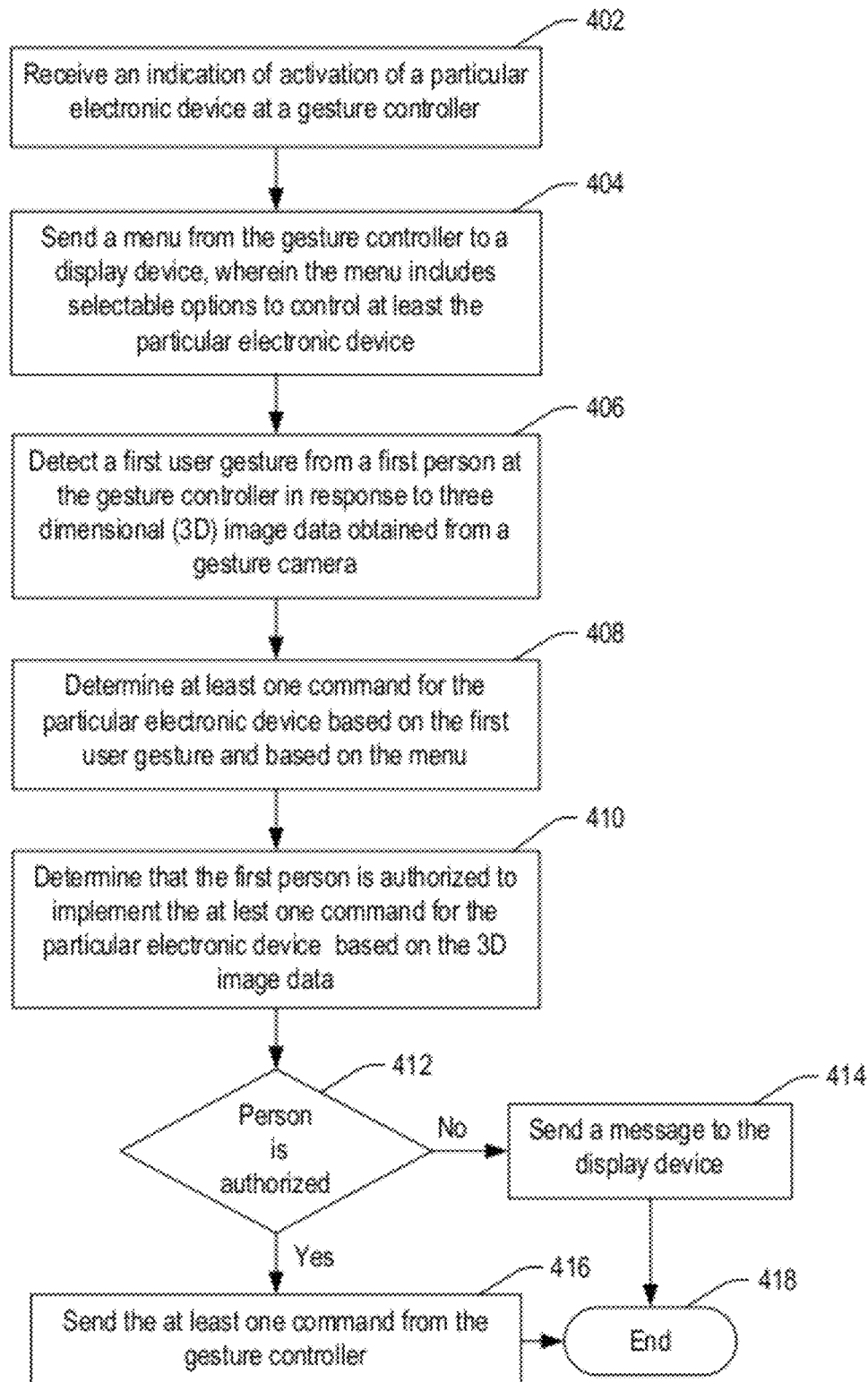
FIG. 4 is a flow chart of a second particular embodiment of a method for device control based on gestures.

Referring to FIG. 4, a flow chart of a second particular embodiment of a method for electronic device control based on gestures is shown. The method may be performed, for example, by the system depicted in FIG. 1.

At 402, an indication of activation of a particular electronic device may be received by a gesture controller. The gesture controller may send a menu to a display device, at 404. The menu may include selectable options to control at least the particular electronic device. The menu may also include selectable options to control other electronic devices. For example, the menu may include an option to mute, pause, or stop one or more other electronic devices that are currently active and may include options to control the particular electronic device.

The menu may be specific to the particular electronic device. For example, the particular electronic device may be a telephone that is activated in response to the telephone receiving an incoming call. When the telephone is a mobile communication device, the gesture controller may receive an activation notice regarding the incoming call from a computer system, a set-top box device, a telephone base station, or other device that detects the presence of the mobile communication device near to the display device (e.g., within the same room as the display device). The gesture controller may receive caller identification information for the incoming call. The menu provided by the gesture controller may include the caller identification information and may provide several options. For example, the options may include, but are not limited to, an option to send the incoming call to voicemail, an option to pause or mute one or more other devices that are currently active and allow the call to ring to the telephone, an option to allow the call to ring to the telephone without changing a status of other active devices, and an option to terminate the call. The options may be presented as icons on the display device. A person using the menu may navigate the menu using navigation gestures (e.g., by moving an arm left or right to move a selection indicator from one icon to another icon) and may select a particular icon by performing a selection gesture (e.g., moving a hand or both hands towards and away from the display device). The icons may be animated or may show still images that suggest one or more gestures. The icons may represent specific gestures that the person can perform to activate particular icons. For example, the icon for terminating the call may show a representation of a user passing a hand in front of the user's throat. In this example, when the person passes a hand in front of his or her throat, the call may be terminated without the person having to navigate to the icon for terminating the call.

As another example, the particular electronic device may be a controller of a security system that is activated (e.g., because a window or a door has been opened). The controller of the security system may send information regarding an alarm to the gesture controller. The gesture controller may send a menu to the display device that presents the information regarding the alarm and options. The options may include, but are not limited to, an option to immediately notify one or more authorities (e.g., a security company, the police, or both) and an option to delay notifying the one or more authorities for a period of time (e.g., 5 minutes). When the person chooses the option to delay, the display screen may show a countdown timer for remaining time, the option to immediately notify the one or more authorities, and an option to resume normal operation of the security system. Should the countdown time reach zero, the one or more authorities may be automatically notified of a potential problem. An attempt by a person other than an authorized individual to select the option to delay or the option to resume normal operation of the security system may result in automatic notification of the one or more authorities of a potential problem.

At 406, a first user gesture from a first person may be detected at the gesture controller in response to three dimensional (3D) image data obtained from a gesture camera. At least one command for the particular device may be determined at the gesture controller based on the first user gesture and the based on the menu, at 408.

At 410, the gesture controller may determine that the first person is authorized to implement the command for the particular device. The authorization may be based on the 3D image data, additional information provided by the first person, or both. The additional information may include, but is not limited to, a username, a password, a voice sample, fingerprint input, other identification credentials, or combinations thereof.

A decision based on the determination of whether the first person is authorized to implement the command may be made, at 412. When the determination is that the first person is not authorized to implement the command, a message may be sent to the display device, at 414. The message may inform the first person that control of the particular device by the first person has been denied. When the determination is that the first person is authorized to implement the command, the command may be sent from the gesture controller to the particular device, at 416. The method may end, at 418.

Various embodiments disclosed herein enable electronic devices within a residence to be controlled based on gestures made by a user. The gestures may enable control of one or more devices without the need for the user to hold, wear, or be in contact with a sensor or a remote control device. Gestures of a user may be detected by a three dimensional (3D) image device. Data from the 3D image device may be analyzed by a gesture controller to determine whether gestures made by the user should be ignored, should result in sending a menu to a display device, should result in navigation of the menu, should result in selection of menu options, or should result in the gesture controller sending at least one command to one or more devices. The gesture controller may replace a remote control device, may be used when the user does not desire to use or cannot easily access the remote control device, or may be used when the user wants to control a device that is able to be controlled using the gesture controller but not the remote control device.

Figure 5:
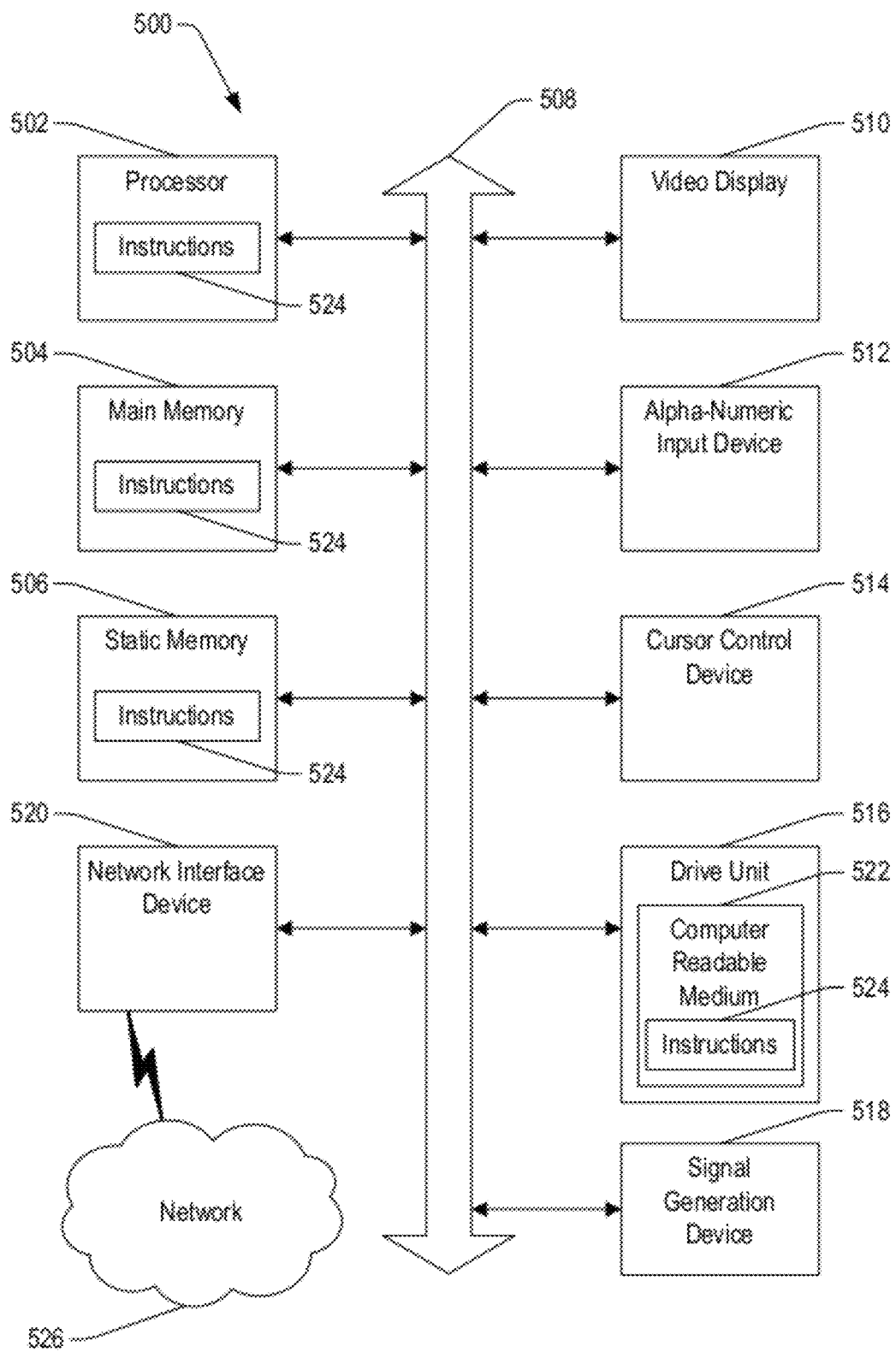
FIG. 5 is a block diagram of an illustrative embodiment of a general computer system.

Referring to FIG. 5, an illustrative embodiment of a general computer system is shown and is designated 500. The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the gesture controller 102, the CPE 106, the media device 108, the display device 110, the computer system 112, the security system 114, one or more of the electronic devices 116, the lighting 118, the mobile communication device 120, and the gesture camera 122 described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 may include a main memory 504 and a static memory 506, which can communicate with each other via a bus 508. As shown, the computer system 500 may further include a video display unit 510, such as a liquid crystal display (LCD), a projection television system, a flat panel display, or a solid state display. Additionally, the computer system 500 may include an input device 512, such as a keyboard, and a cursor control device 514, such as a mouse. The computer system 500 may also include a disk drive unit 516, a signal generation device 518, such as a speaker or remote control, and a network interface device 520. Some computer systems 500 may not include an input device (e.g., a server may not include an input device).

In a particular embodiment, as depicted in FIG. 5, the disk drive unit 516 may include a computer-readable non-transitory storage medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable non-transitory storage medium 522 that stores instructions 524 or receives, stores and executes instructions 524, so that a device connected to a network 526 may communicate voice, video or data over the network 526. Further, the instructions 524 may be transmitted or received over the network 526 via the network interface device 520.

While the computer-readable non-transitory storage medium is shown to be a single medium, the term "computer-readable non-transitory medium" includes a single medium or multiple media, such as a centralized or distributed database, and/or associated caches and servers that store one or more sets of instructions. The term "computer-readable non-transitory medium" shall also include any medium that is capable of storing or encoding a set of instructions for execution by a processor or that cause a computer system to perform any one or more of the methods or operations disclosed herein.

In a particular non-limiting, exemplary embodiment, the computer-readable non-transitory storage medium may include a solid-state memory such as a memory card or other package that houses one or more non-volatile read-only memories. Further, the computer-readable non-transitory storage medium may be a random access memory or other volatile re-writable memory. Additionally, the computer-readable non-transitory storage medium may include a magneto-optical or optical medium, such as a disk or tapes or other storage device. Accordingly, the disclosure is considered to include any one or more of a computer-readable non-transitory storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
    a processor;
    an image sensor configured to send image data to the processor; and
    an interface coupled to the processor and configured to communicate with a device,
    wherein the processor is configured to:
        initiate a first control session in response to detecting a first recognized initiate gesture performed by a first authorized user, wherein during the first control session, the processor is configured to:
            detect a first gesture made by the first authorized user based on the image data;
            identify a first command based on the first gesture, the first command associated with the device;
            determine whether the first command is authorized based on a time restriction associated with the first authorized user; and
            responsive to a determination that the first command is authorized, send the first command to the device via the interface;
            ignore a second recognized command gesture performed by a second authorized user;
            detect a recognized end gesture made by the first authorized user; and
            end the first control session in response to the recognize end gesture;
    wherein the processor is configured to initiate a second control session in response to detecting a second recognized initiate gestured performed by the second authorized user; and
    wherein during the second control session, the processor is configured to:
        send a second command via the interface to the device in response to a third recognized command gesture performed by the second authorized user; and
        ignore a fourth recognized command gesture performed by the first authorized user.

2. The system of claim 1, wherein the image sensor comprises an emitter.

3. The system of claim 1, wherein the processor determines the command is authorized based further on a voice sample supplied in response to a prompt for the voice sample.

4. The system of claim 1, wherein the processor sends a notification to a display device when the processor determines that the first authorized user is not authorized to initiate the first command.

5. The system of claim 1, further comprising a display interface, wherein, during the first control session, the processor sends a menu corresponding to the first control session to a display via the display interface.

6. The system of claim 1, wherein the processor ends the second control session after passage of a particular time without receipt of a recognized gesture that corresponds to movement by the second authorized user, and wherein the processor ignores gestures after an end of the second control session until the processor detects another recognized initiate gesture.

7. The system of claim 5, wherein the menu includes animated icons.

8. The system of claim 1, wherein the device corresponds to a security system.

9. The system of claim 1, wherein the time restriction is not associated with a second user.

10. The system of claim 1, wherein the time restriction defines a time of day during which the first command is not authorized for the first user.

11. The system of claim 1, wherein the processor is configured to send commands to a plurality of devices, and wherein the time restriction is specific to the device.

12. The system of claim 1, wherein the time restriction is specific to the first command.

13. A method, comprising:
    detecting, at a processor, a first recognized initiate gesture made by a first authorized user based on first image data received by a controller from a camera;
    initiating, at the processor, a first control session in response to the first recognized initiate gesture;
    during the first control session:
        detecting, at the processor, a first command gesture performed by the first authorized user;

identifying, at the processor, a first command based on the first command gesture, the first command associated with a device;

determining, at the processor, whether the first command is authorized based on a time restriction associated with the first authorized user;

responsive to a determination that the first command is authorized, sending the first command to the device;

ignoring, at the processor, a second recognized command gesture performed by a second authorized user;

detecting, at the processor, a recognized end gesture made by the first authorized user; and ending, at the processor, the first control session in response to the recognized end gesture;

detecting, at the processor, a second recognized initiate gesture made by the second authorized user based on second image data received by the controller from the camera;

initiating, at the processor, a second control session in response to the second recognized initiate gesture; and during the second control session:
sending a second command to the device in response to a third recognized command gesture performed by the second authorized user; and
ignoring, at the processor, a fourth recognized command gesture performed by the first authorized user.

14. The method of claim 13, further comprising:
ending the second control session based on detecting passage of a preset inactivity time from a previous gesture of the second authorized user detected by the controller.

15. The method of claim 13, further comprising receiving a signal indicating activation of the device and sending a menu to a display device.

16. The method of claim 15, wherein the device comprises a telephone and wherein the menu comprises selectable options including a first option to mute at least one other device and enable a ring signal for an incoming call to be sent to the telephone and a second option to enable the ring signal for the incoming call to be sent to the telephone without muting the at least one other device.

17. The method of claim 15, wherein the device comprises a mobile communication device, and wherein presence of the mobile communication device near the display device is detected before sending the menu to the display device.

18. The method of claim 13, further comprising receiving additional information in response to a prompt for the additional information, wherein determining whether the first command is authorized is based further on the additional information.

19. A computer readable storage device comprising executable instructions that, when executed by a processor, cause the processor to perform operations including:
detecting a first recognized initiate gesture made by a first authorized user based on first image data from a camera;
initiating a first control session in response to the first recognized initiate gesture;
during the first control session:
detecting a first command gesture performed by the first authorized user;
identifying a first command based on the first command gesture, the first command associated with a device;
determining whether the first command is authorized based on a time restriction associated with the first authorized user;
responsive to a determination that the first command is authorized, sending the first command to the device;
ignoring a second recognized command gesture performed by a second authorized user;
detecting a recognized end gesture made by the first authorized user;
ending the first control session in response to the recognized end gesture;
detecting a second recognized initiate gesture made by the second authorized user based on second image data received from the camera;
initiating a second control session in response to the second recognized initiate gesture; and
during the second control session:
sending a second command to the device in response to a third recognized command gesture performed by the second authorized user; and
ignoring a fourth recognized command gesture performed by the first authorized user.

20. The computer readable storage device of claim 19, wherein the operations further include:
sending a menu to a display device, wherein the third recognized gesture corresponds to a particular navigate gesture to navigate the menu; and
updating the menu sent to the display device based on the third recognized gesture.

* * * * *